United States Patent
Iimura et al.

(10) Patent No.: US 12,054,218 B2
(45) Date of Patent: Aug. 6, 2024

(54) WHEEL WEAR COMPUTING SYSTEM

(71) Applicant: HONDA MOTOR CO., LTD., Tokyo (JP)

(72) Inventors: Taiki Iimura, Saitama (JP); Ritsuya Oshima, Saitama (JP); Shintaro Uchida, Saitama (JP); Hiroshi Iwakami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 17/874,620

(22) Filed: Jul. 27, 2022

(65) Prior Publication Data

US 2023/0033879 A1    Feb. 2, 2023

(30) Foreign Application Priority Data

Jul. 29, 2021    (JP) .................................. 2021-124312

(51) Int. Cl.
| | | |
|---|---|---|
| B62K 11/00 | (2006.01) | |
| B60C 11/24 | (2006.01) | |
| B62J 45/423 | (2020.01) | |
| B62K 1/00 | (2006.01) | |

(52) U.S. Cl.
CPC .......... B62K 11/007 (2016.11); B60C 11/246 (2013.01); B62J 45/423 (2020.02); B62K 1/00 (2013.01)

(58) Field of Classification Search
CPC ....... B62K 11/007; B62K 1/00; B60C 11/246; B62J 45/423; B62B 2301/25; B62B 9/00; B60B 19/003; G01M 17/013; G01M 17/02; G01M 17/007
See application file for complete search history.

(56) References Cited

U.S. PATENT DOCUMENTS

| | | |
|---|---|---|
| 7,320,246 B2 | 1/2008 | Schick et al. |
| 2018/0111655 A1 | 4/2018 | Inada et al. |
| 2019/0270347 A1 | 9/2019 | Stewart et al. |

FOREIGN PATENT DOCUMENTS

| | | |
|---|---|---|
| EP | 2172759 A1 | 4/2010 |
| GB | 2531746 A | 5/2016 |
| JP | 2012126308 A | 7/2012 |
| JP | 2015051704 A | 3/2015 |

OTHER PUBLICATIONS

Extended European Search Report for EP Patent Application 22187406.8 dated Dec. 15, 2022; 8 pp.
1 Office Action for Indian Patent Application 202244042967 dated Mar. 15, 2023; 6 pp.
Notice of Reasons for Refusal for Japanese Patent Application No. 2021-124312 dated Jun. 4, 2024; 6 pp.

*Primary Examiner* — Hunter B Lonsberry
*Assistant Examiner* — Henry R Hinton
(74) *Attorney, Agent, or Firm* — Armstrong Teasdale LLP

(57) ABSTRACT

A wear computing system (100, 200, 300) for computing a wear of a wheel (3) of a vehicle (2) comprises a revolution sensor (48) configured to detect a number of revolutions of the wheel (3), an acceleration sensor (49) configured to detect an acceleration of the vehicle (2) in a travel direction thereof, and a control unit (7) configured to compute a travel distance of the vehicle from the acceleration of the vehicle, and compute the wear from the travel distance and the number of revolutions of the wheel (3).

9 Claims, 7 Drawing Sheets

WHEEL WEAR COMPUTING SYSTEM

TECHNICAL FIELD

The present invention relates to a wheel wear computing system.

BACKGROUND ART

Conventionally, it is known to compute or estimate the wear of a wheel or a tire for maintenance purposes from various data, instead of directly measuring the wear. See JP2015-051704A, for instance.

According to the system disclosed in P2015-051704A, the wear of a wheel is estimated from a travel distance of a vehicle which is computed from the position information of the vehicle acquired from GPS satellites. According to this prior art, the number of revolutions of the wheel that is required for the vehicle to travel the estimated travel distance is computed, and the wear of the wheel or the change in the diameter of the wheel is computed from this number of revolutions.

However, according to this prior art, since the travel distance is computed from the position information of the vehicle obtained from GPS satellites, the wear cannot be computed when the vehicle travels in a tunnel, indoor, or any other location where GPS signals are not available. Furthermore, the position information obtained from GPS satellites contain errors typically in the order of meters, and the time intervals of GPS signal receptions may be relatively long so that the accuracy may not be adequately high.

SUMMARY OF THE INVENTION

In view of such a problem of the prior art, a primary object of the present invention is to provide a wheel wear computing system than can compute the wear of a vehicle wheel at a high precision even when GPS signals are not available.

To achieve such an object, the present invention provides a wear computing system (100, 200, 300) for computing a wear of a wheel (3) of a vehicle (2), comprising: a revolution sensor (48) configured to detect a number of revolutions of the wheel (3); an acceleration sensor (49) configured to detect an acceleration of the vehicle (2) in a travel direction thereof; and a control unit (7) configured to compute a travel distance of the vehicle from the acceleration of the vehicle, and compute the wear from the travel distance and the number of revolutions of the wheel (3).

Thereby, even when GPS signals are not available, the wear of the vehicle wheel can be computed. Furthermore, since the acceleration sensor can provide data substantially more often than GPS satellites, the wear can be computed at a comparative high precision.

According to a certain aspect of the present invention, the wheel (3) includes a main wheel (19), the main wheel including an annular member (31) having a laterally extending central axial line (Y1), and a plurality of driven rollers (32) rotatably supported by the annular member around tangential lines of the annular member at respective positions of the driven rollers, and a pair of drive disks (18), each drive disk including a hub (18A) supported by a vehicle body of the vehicle on a corresponding side of the main wheel so as to be rotatable around a rotational center line substantially coaxial with the central axial line of the annular member, and a plurality of drive rollers (18A) circumferentially positioned thereon so as to be rotatable around a rotational center line in a skewed relationship to the rotational center line of the hub and in engagement with the driven rollers, and wherein the revolution sensor (48) is configured to detect a revolution number of the main wheel, and a revolution number of the driven rollers, the acceleration sensor (49) is configured to detect a fore and aft acceleration and a lateral acceleration of the vehicle, and the control unit is configured to compute a fore and aft travel distance from the fore and aft acceleration, a second wear from the fore and aft travel distance and the revolution number of the main wheel, a lateral travel distance from the lateral acceleration, a third wear from the lateral travel distance and the revolution number of the driven rollers, and a first wear from the second wear and the third wear, the first wear being the wear of the wheel.

Thus, in the case of a wheel that can travel in all directions, the fore and aft travel distance and the lateral travel distance of the vehicle can be taken into account in computing the wheel wear so that the wheel wear can be computed at a comparatively high precision.

Preferably, the control unit (7) computes the sum of the second wear and the third wear as the first wear.

Thereby, the wheel wear can be computed with a comparatively high accuracy. Optionally, the second wear and the third wear may be weighted with certain factors, and the first wear may be computed as a weighted sum of the second wear and the third wear.

Preferably, the wear computing system further comprises a measuring device (52) for measuring a distance between the central axial line (Y1) of the main wheel and a point on an outer periphery of the main wheel directly under the central axial line, and the control unit (7) is configured to compute a fourth wear by comparing the measured distance and an original distance between the central axial line (Y1) of the main wheel and the point on the outer periphery of the main wheel, the fourth wear being adopted as the wear of the wheel, instead of the first wear, when the fourth wear is larger than the first wear.

Thereby, the wear of the wheel can be computed with a higher reliability.

Preferably, the vehicle is provided with a drive unit (4) for rotating the driven rollers according to a prescribed schedule while the vehicle travels in the fore and aft direction.

Thereby, unevenness in the wear of the driven rollers can be reduced.

In this case, the vehicle (2) may be provided with a pair of wheels (3) arranged on either side, and when the vehicle is traveling in the fore and aft direction, the drive unit (4) may be operated such that the driven rollers of the main wheel are rotated in opposite directions according to a prescribed schedule.

Thereby, unevenness of wear among the different driven rollers can be reduced.

Preferably, the wear computing system further comprises a display unit (45) that displays at least one of the wheel wear, the first wear, the second wear, and the third wear.

Thereby, the user can easily know the state of the wear of the wheel.

Preferably, the wear computing system further comprises a temperature sensor (50) for detecting a temperature of the driven rollers, and a vertical load sensor for detecting a vertical load of the vehicle, the control unit being configured to compute an effective diameter of the driven rollers and/or the main wheel by taking into account an elastic modulus of the driven rollers under the detected temperature, and the detected vertical load, and to compute the travel distance from the revolution number of the driven rollers and/or the revolution number of the main wheel by taking into account of the effective diameter.

By taking into account the influence of the softening and hardening of the wheel due to the temperature change on the diameter of the wheel, the accuracy in estimating the wear of the wheel can be further improved.

Preferably, the vehicle (2) is provided with a drive unit (4) for driving the wheel, and the revolution sensor is configured to count revolutions of an output of the drive unit, and the number of revolutions of the wheel is obtained by multiplying a coefficient greater than zero and smaller than 1 to a count of the revolutions of the output of the drive unit.

Thereby, the revolutions of the main wheel can be detected with relative ease.

The present invention thus provides a wheel wear computing system than can compute the wear of a vehicle wheel at a high precision even when GPS signals are not available.

BRIEF DESCRIPTION OF THE DRAWING(S)

DESCRIPTION OF THE PREFERRED EMBODIMENT(S)

Preferred embodiments of the present invention will be described in the following with reference to the appended drawings.

Figure 1:
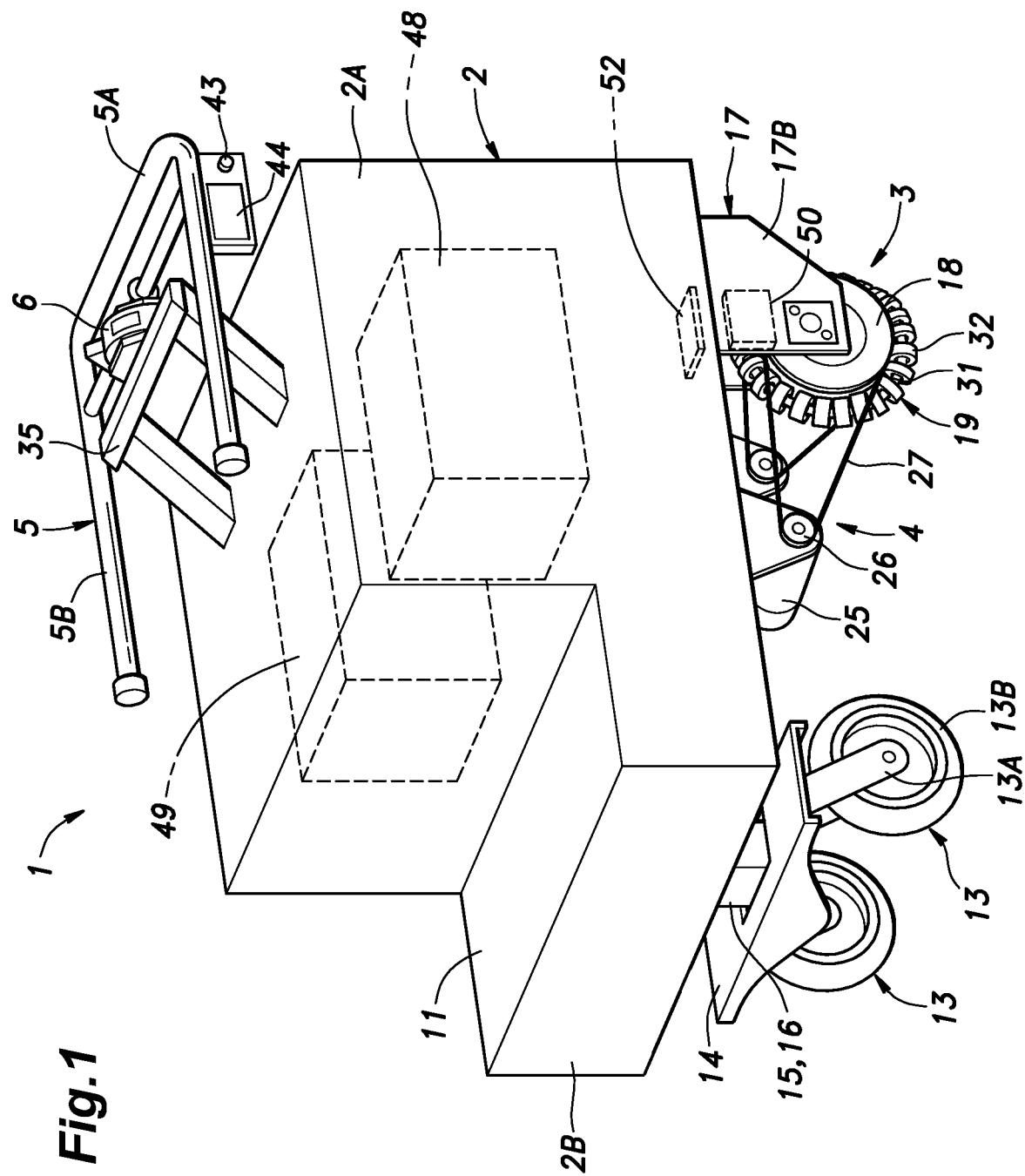
FIG. 1 is a perspective view of a cart equipped with a wear computing system according to a first embodiment of the present invention.
Figure 2:
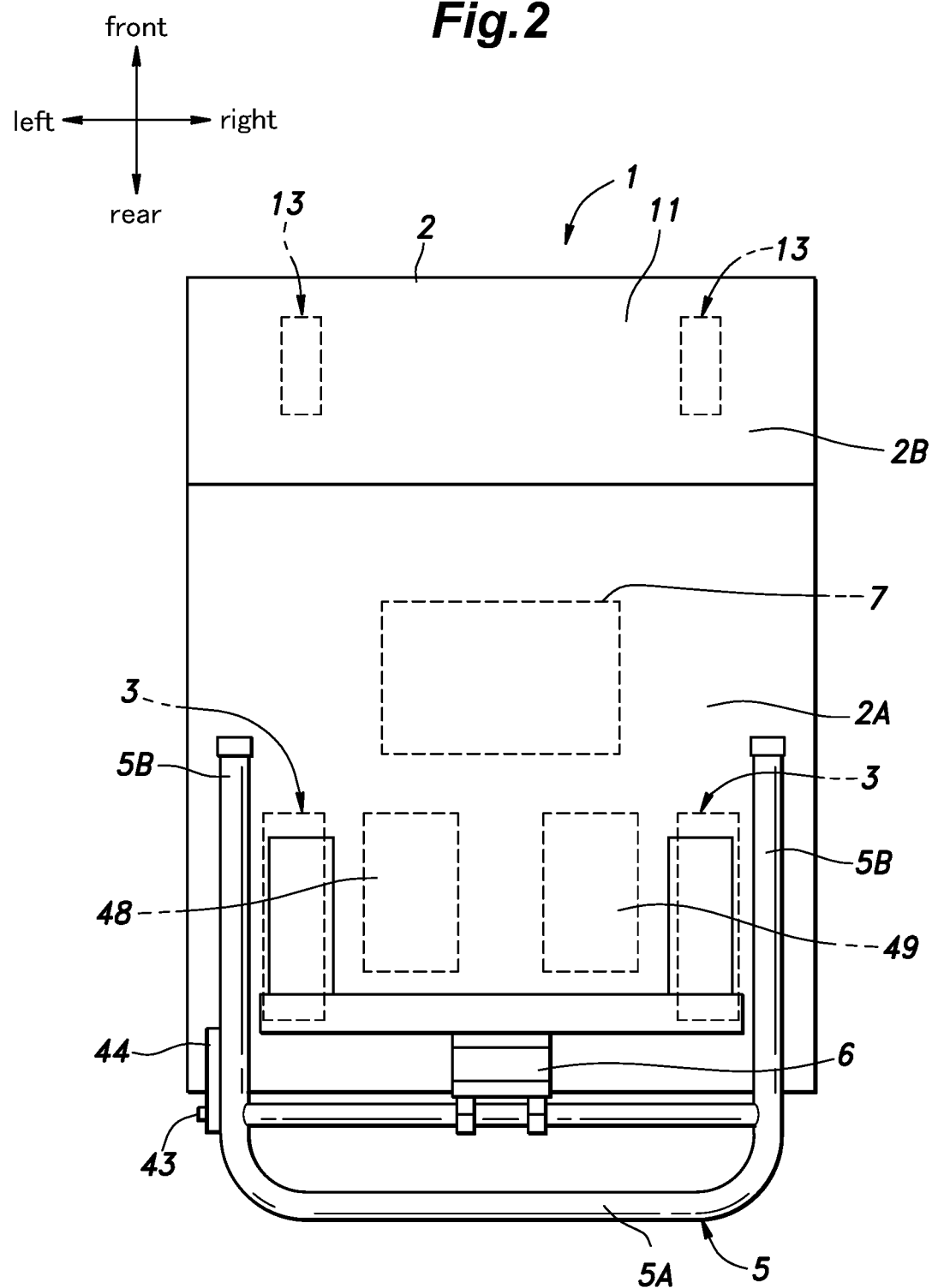
FIG. 2 is a plan view of the cart of the first embodiment.

FIGS. 1 and 2 show a cart 1 to which the present invention is applied. The cart 1 includes a vehicle body 2, a pair of omnidirectional wheels 3 serving as rear wheels of this cart 1, a pair of front wheels 13 consisting of per se known caster wheels, a pair of drive units 4 mounted to the vehicle body 2 for driving the respective omnidirectional wheels 3, a handle 5 fitted to an upper rear part of the cart 1 for operating the cart 1 as will be described hereinafter, a load sensor 6 for detecting a load applied to the handle 5, and a control unit 7 for controlling the drive units 4 according to the load detected by the load sensor 6.

The vehicle body 2 is somewhat elongated in the fore and aft direction, and includes a rear part 2A defining a machine compartment therein, and a front part 2B provided with an upwardly facing support base 11 which is lowered relative to the rear part 2A for supporting cargos, equipment or the like. Relatively heavy equipment such as an X-ray scanner can be mounted on the front part 2B and suitably secured thereto. The equipment may be fastened to the support base 11 with a suitable fitting not shown in the drawings. The machine compartment provided in the rear part 2A may accommodate a battery as well the control unit 7 and the various sensors therein.

As shown in FIG. 1, the front wheels 13 are attached to a suspension base 14 which is in turn supported by the vehicle body 2 via a spring 15 and a damper 16. Each front wheel 13 consists of a fork 13A having a base end attached to the suspension base 14 and a wheel body 13B rotatably supported by the two arms of the fork 13A.

Figure 3:
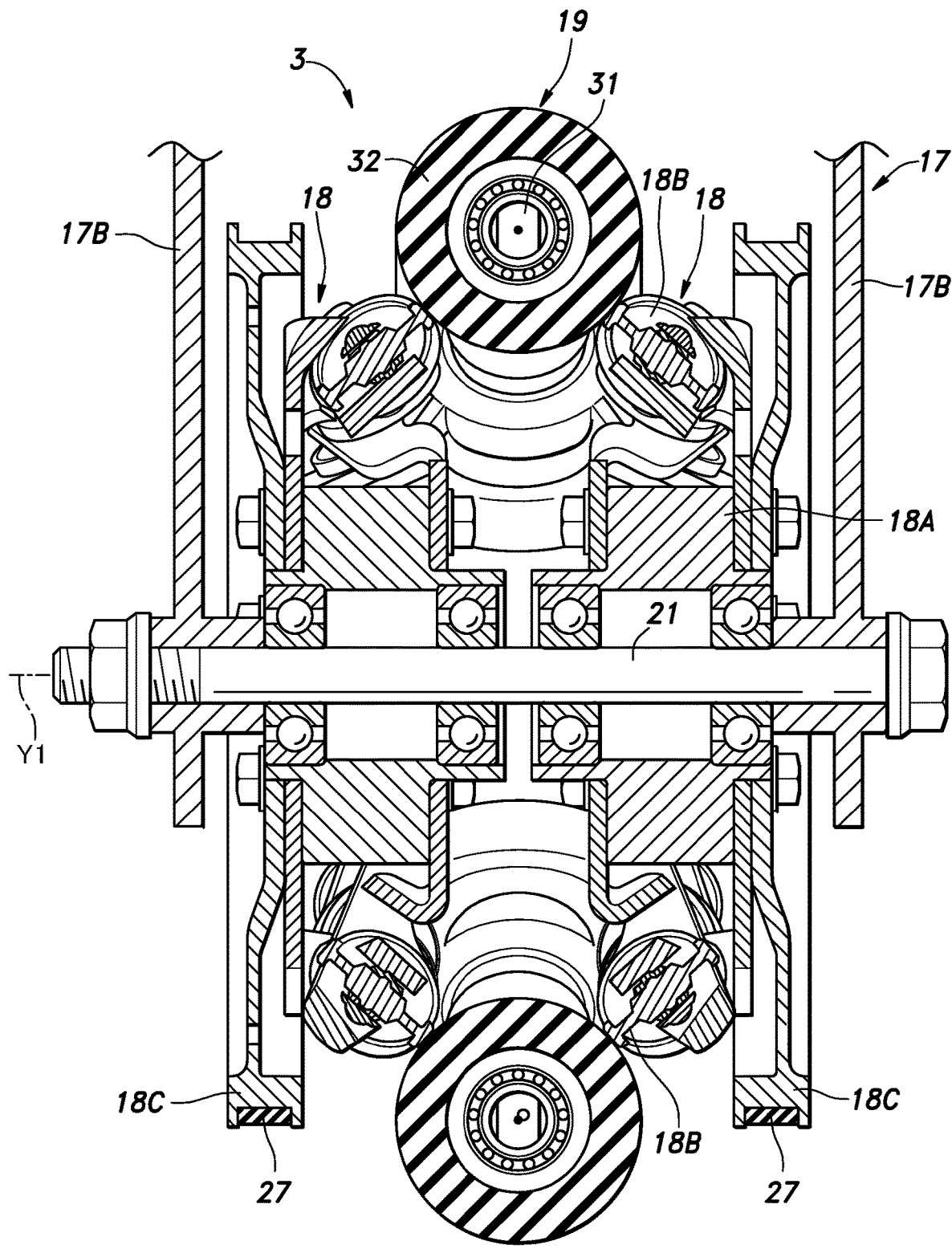
FIG. 3 is a sectional view of an omnidirectional wheel provided in the cart of the first embodiment.

As shown in FIGS. 1 and 2, the omnidirectional wheels 3 are positioned at the lower left and lower right corners of the rear part 2A of the vehicle body 2, and are laterally spaced from each other. As shown in FIGS. 1 to 3, a frame part 17 is fixedly attached to each side of the lower rear part of the vehicle body 2, and includes a pair of laterally facing side plates 17B extending downward in parallel to each other.

Each omnidirectional wheel 3 is provided with a pair of drive disks 18 rotatably supported by the corresponding pair of the side plates 17B therebetween, and an annular main wheel 19 interposed between the drive disks 18. Since the two omnidirectional wheels 3 are identical in structure, only one of them will be described in the following disclosure.

As shown in FIG. 3, a support shaft 21 extends laterally between the side plates 17B. Each drive disk 18 includes a pair of disk-shaped hubs 18A rotatably supported (about the axial line Y1 of the support shaft 21) by the side plates 17B and a plurality of drive rollers 18B each rotatably supported by the corresponding hub 18A about an axial line which is skewed relative to the radial line and the major plane of the hub 18A. The drive disks 18 are thus rotatably supported on the support shaft 21. The drive disks 18 are restricted from moving laterally with respect to the support shaft 21 so that drive disks 18 oppose each other at a prescribed lateral distance.

On the outer side of each hub 18A is fixedly attached a driven pulley 18C in a coaxial relationship to the hub 18A. Each drive unit 4 which may be mounted to a lower part of the vehicle body 2 is provided with a pair of drive pulleys 26 which are individually actuated by respective electric motors 25 included in the corresponding drive unit 4. A drive belt 27 typically consisting of a cogged belt is passed around each drive pulley 26 and the corresponding driven pulley 18C. The drive disks 18 are thus rotationally driven by the corresponding drive unit 4. In particular, the two drive disks 18 can be individually driven by the electric motors 25 included in the drive unit 4.

Figure 4:
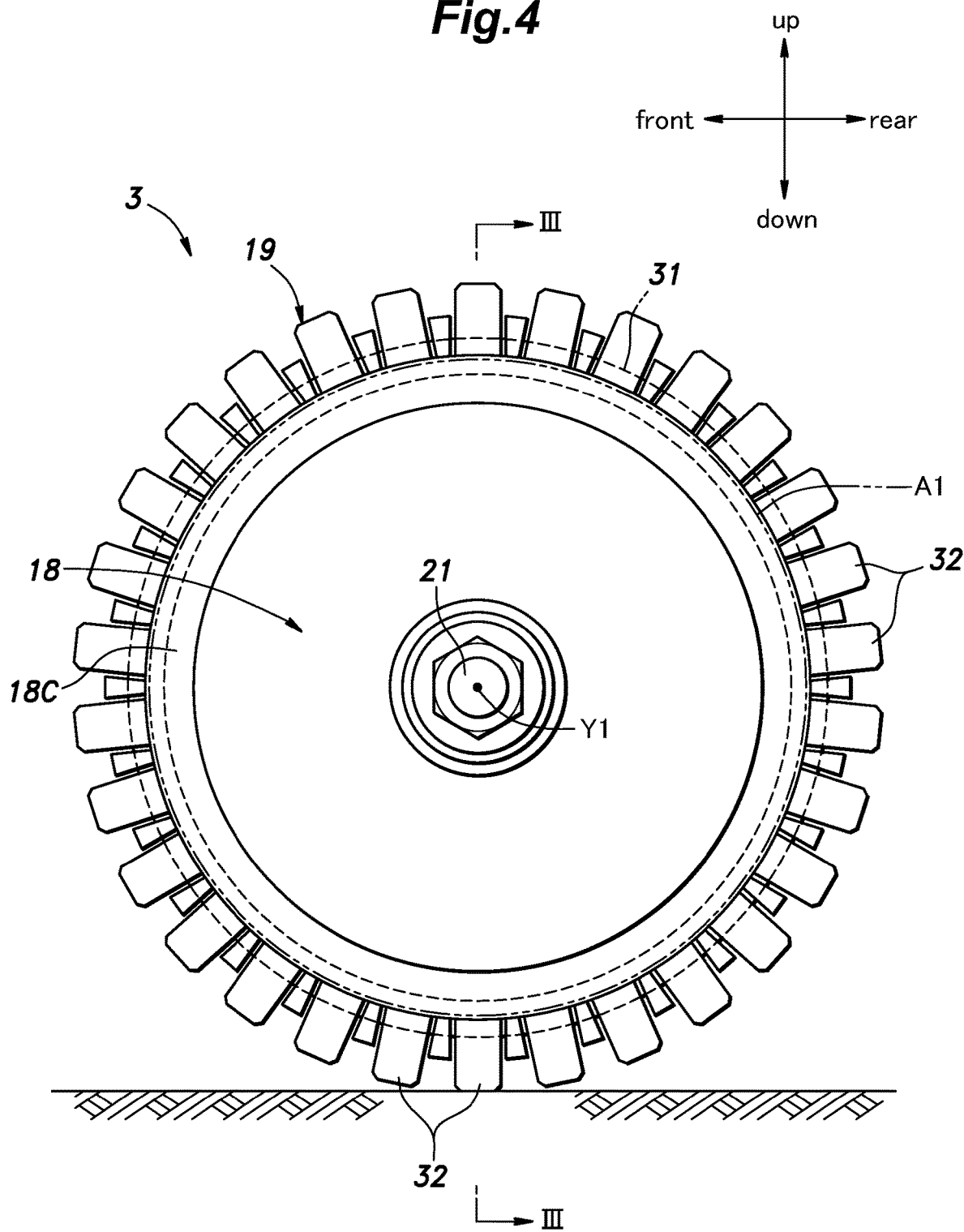
FIG. 4 is a side view of the omnidirectional wheel.

As shown in FIGS. 3 and 4, the main wheel 19 is positioned between the drive disks 18 in a substantially coaxial relationship to the drive disks 18, and includes an annular member 31 and a plurality of driven rollers 32 each supported by the annular member 31 so as to be rotatable around the tangential line of the point on the periphery of the annular member 31 at which the particular driven roller 32 is positioned. The driven rollers 32 are arranged at equal intervals in the circumferential direction of the annular member 31.

The main wheel 19 is laterally pressed between the drive disks 18, and is solely supported by the drive disks 18. More specifically, the drive rollers 18B of the drive disks 18 are in rolling contact with the driven rollers 32 of the main wheel 19. As shown in FIG. 3, the drive rollers 18B are in contact with the driven rollers 32 such that the inner periphery of the main wheel 19 is pushed radially outward by the drive rollers 18B of the drive disks 18.

The mode of operation of this omnidirectional wheel 3 will be described in the following. When the drive disks 18 are rotated in the normal direction at the same rotational speed, the driven rollers 32 do not rotate, and the main wheel 19 is rotationally driven in the normal or forward direction. As a result, the vehicle travels straight ahead. Similarly, when the drive disks 18 are rotated in the reverse direction at the same rotational speed, the vehicle travels straight backward.

When the drive disks 18 are rotated at the same rotational speed in mutually opposite directions, the driven rollers 32 rotate in the corresponding direction, causing the vehicle to travel sideways while the main wheel 19 remains stationary. When the drive disks 18 are rotated at different speeds, the vehicle travels in an oblique direction which is determined by the difference in the rotational speeds of the drive disks 18.

The control unit 7 is configured to control the drive units 4 according to the signal provided by the load sensor 6 interposed between the vehicle body 2 and the handle 5. The load sensor 6 detects the magnitude and direction of the operating force (load) applied to the handle 5 by the user, and determines the traveling direction and traction force of the cart 1 based on the signal from the load sensor 6 by controlling the control amounts of the electric motors 25 of the drive units 4.

Owing to the characteristics of the drive units 4 discussed above, the control unit 7 is able to move the cart 1 forward, backward, laterally or in any desired oblique direction according to the load applied to the handle 5 by the user. In the case where the cart 1 travels straight ahead or backward most of the time, the driven rollers 32 may each keep contacting the ground surface at a single spot. As a result, the driven rollers 32 may be worn out unevenly. To overcome this problem, the cart 1 of the illustrated embodiment is provided with a function to prevent uneven wear of the driven rollers 32. More specifically, the control unit 7 is configured to cause the cart 1 to move sideways by a small distance. This lateral movement may correspond to a half turn of the driven rollers 32. By moving the cart 1 laterally according to a prescribed schedule, the unevenness in the wear of the driven rollers 32 can be reduced or eliminated. When two omnidirectional wheels 3 are used one next to the other as in the case of the illustrated embodiment, the drive units 4 may be controlled by the control unit 7 such that the two omnidirectional wheels 3 are caused to travel sideways in mutually opposite directions. Thereby, the driven rollers 32 of the two omnidirectional wheels 3 are turned by a certain angle so that the ground contact points of the driven rollers 32 can be changed without actually causing the cart 1 to travel sideways. Thus, the unevenness in the wear of the driven rollers 32 can be avoided without causing any unnecessary movement to the cart 1 or causing any discomfort to the user of the cart 1.

The cart 1 is fitted with a wear computing system 100 according to a first embodiment of the present invention. Since the cart 1 travels primarily straight ahead in use, the wear computing system 100 is configured to compute or estimate the wear of the omnidirectional wheels 3 which is considered to be incurred when the cart 1 is traveling straight ahead. The wear computing system 100 is incorporated in the control unit 7 that controls the overall operation of the cart 1. Alternatively, the wear computing system 100 may be a device separate from the control unit 7.

An operation panel is provided on the vehicle body 2 in the vicinity of the handle 5. As shown in FIGS. 1 and 2, the operation panel is provided with a switch 43 for notifying the wear computing system 100 that the omnidirectional wheel 3 has been replaced, and a display unit 44 for displaying information regarding the monitoring of wheel wear to the user. In the following description, it is assumed that the two omnidirectional wheels 3 wear in a similar fashion so that the attention may be drawn to only one of the omnidirectional wheels 3.

The wear computing system 100 includes a revolution measurement module 48 including a revolution sensor for detecting the revolution of the omnidirectional wheel 3, or in particular, the revolution of the main wheel 19, and a travel distance computing module 49 including an acceleration sensor (not shown in the drawings) such as an accelerometer and a gyroscope for providing data for travel distance computation.

Figure 5:
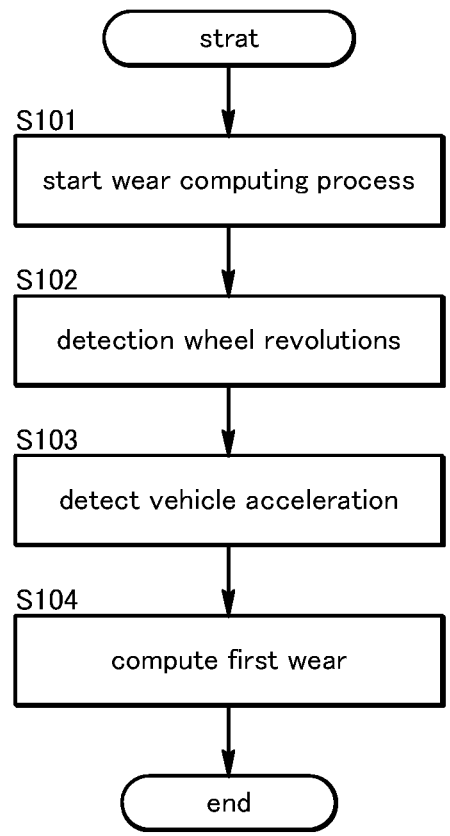
FIG. 5 is a flowchart of the wear computing process executed by the wear computing system of the first embodiment.

The wear computing process performed by the wear computing system 100 will be described in the following with reference to the flowchart shown in FIG. 5. First of all, the wear computing system 100 determines if the omnidirectional wheel 3 has been changed to a new one according to the signal from the switch 43 which is operated when the omnidirectional wheel 3 is replaced. When the cart 1 is newly shipped or the omnidirectional wheel 3 is newly replaced, a new wear computing process is started (step S101).

When the cart 1 is started traveling forward by operating the handle 5 or the like, the revolution measurement module 48 detects the revolutions of the main wheel 19 as the count (number) of revolutions (the number of revolutions is accumulated) (step S102).

The travel distance computing module 49 then detects the acceleration of the cart 1 in the fore and aft direction by the acceleration sensor (step S103). By twice integrating the fore and aft acceleration with respect to time, the travel distance of the cart 1 in the fore and aft direction is computed.

The travel distance of the cart 1 calculated from the fore and aft acceleration is compared with the travel distance calculated by multiplying the number of revolutions of the main wheel 19 accumulated by the revolution measurement module 48 by the circumferential length of the main wheel 19 (which is calculated by multiplying the diameter of the main wheel 19 by pie). By comparing the two values of the travel distance computed by these two methods, the change in the diameter of the main wheel 19 can be calculated (step S104). The wear computed in this way is referred to as "first wear". The measurement process may be executed according to a prescribed schedule either in terms of time or the travel distance of the cart during the service life of the main wheel 19. More specifically, when the number of revolutions of the main wheel 19 during a prescribed time period is n, the fore and aft travel distance of the cart 1 during this time period is d, the radius of the main wheel 19 is r, and the wear (first wear) of the main wheel 19 is Ar, the following relationship holds:

$$d=2\pi(r-\Delta r)\times n$$

Therefore, the wear can be obtained as given in the following:

$$\Delta r=r-d/(2\pi n)$$

Thus, by repeating this measurement process according to a prescribed schedule, a history of the wear of the main wheel 19 can be obtained. Further, since the computed wear may fluctuate from one measurement to another, the least square method, moving average and other techniques may be used to smooth the data.

The wear computing system 100 adopts the first wear computed in this way as the wear (wheel wear) of the omnidirectional wheels 3 caused by the traveling of the cart 1 in the fore and aft direction. The computed wheel wear may be transmitted to the display unit 44 to display the wheel wear on a screen of the display unit 44. Further, if the wear is individually computed for the two omnidirectional wheels 3, the display unit 44 may be configured to display the wears of the omnidirectional wheels 3 individually so that the user may which of the omnidirectional wheels 3 has worn out to a level that requires replacement.

Advantages of the wear computing system 100 according to the first embodiment will be discussed in the following. The wear of the main wheel 19 of the cart 1 can be computed even when traveling in a place where GPS position information is not available. Further, since the vehicle position information obtained by using the acceleration sensor can be performed more frequently as compared with the case where GPS satellite signals are used, the wear can be computed with relatively high accuracy.

Figure 6:
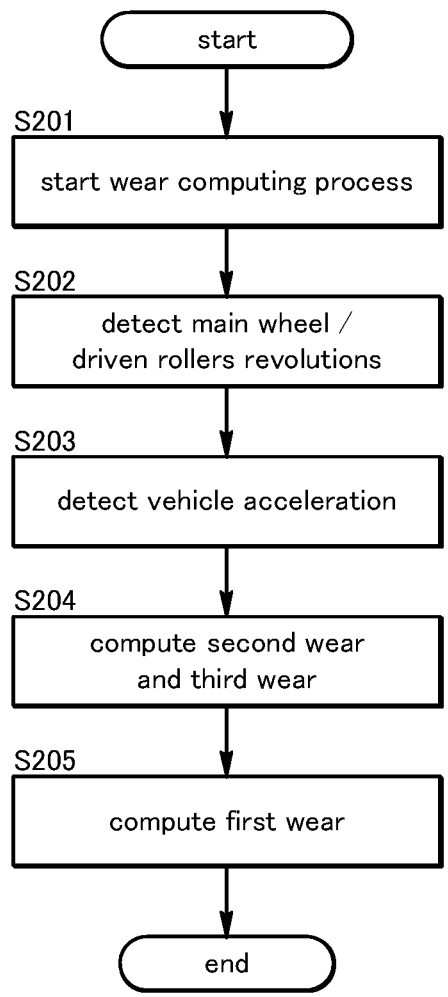
FIG. 6 is a flowchart of the wear computing process executed by the wear computing system of a second embodiment of the present invention.

The wear computing process performed by a wear computing system 200 according to a second embodiment of the present invention will be described in the following with reference to the flowchart shown in FIG. 6. The wear computing process performed by the wear computing system 200 of the second embodiment computes the wear (wheel wear) of the omnidirectional wheel 3 by taking into account not only the fore and aft travel of the omnidirectional wheel 3 but also the lateral travel of the omnidirectional wheel 3. In this wear computing system 200, the revolution measurement module 48 is configured to measure not only the revolutions of the main wheel 19 but also the revolutions of the driven rollers 32 around the rotational center lines thereof. Since the wear computing system 200 is otherwise similar to the wear computing system 100 of the first embodiment, the parts thereof common to the wear computing system 100 of the first embodiment will be omitted from the following description.

When the cart 1 is newly shipped or the omnidirectional wheel 3 is newly replaced, a new wear computing process is started (step S201). When the cart 1 is traveling, the revolution measurement module 48 of the wear computing system 200 first detects the revolutions of the main wheel 19. The revolution measurement module 48 of the wear computing system 200 also detects the revolutions of the driven rollers 32. The numbers of the revolutions of the main wheel 19 and the driven rollers 32 are individually accumulated (step S302).

The travel distance computing module 49 of the wear computing system 200 detects the fore and aft acceleration of the cart 1 and the lateral acceleration of the cart 1 by using the acceleration sensor (step S203). By twice integrating the fore and aft acceleration and lateral acceleration with respect to time, the travel distance of the cart 1 in the fore and aft direction and lateral direction, respectively, can be computed.

The travel distance of the cart 1 calculated from the fore and aft acceleration is compared with the travel distance calculated by multiplying the revolutions of the main wheel 19 accumulated by the revolution measurement module 48 by the circumferential length of the main wheel 19 (which is calculated by multiplying the diameter of the main wheel 19 by pie). By comparing the two values of the travel distance obtained by these two methods, the change in the diameter of the main wheel 19 can be calculated (step S204). The wear computed in this way is referred to as "second wear". Similarly, the travel distance of the cart 1 calculated from the lateral acceleration is compared with the travel distance calculated by multiplying the revolutions of the driven rollers 32 accumulated by the revolution measurement module 48 by the circumferential length of the driven rollers 32 (which is calculated by multiplying the diameter of the driven rollers 32 by pie). By comparing the two values of the travel distance obtained by these two methods, the change in the diameter of the driven rollers 32 can be calculated (step S204). The wear computed in this way is referred to as "third wear". Similarly as in the first embodiment, the measurement process may be executed according to a prescribed schedule either in terms of time or the travel distance of the cart 1 during the service life of the main wheel 19.

The sum of the second wear and the third wear is adopted as the first wear (step S205). Thus, the first wear provides the wear of the main wheel 19. According to a modified embodiment of the present invention, in order to account for the contributions of the fore and aft travel and the lateral travel of the cart 1 to the wear of the main wheel 19, a first predetermined factor and a second predetermined factor may be multiplied to the second wear and the third wear, respectively, and the sum of these multiplied values may be adopted as the first wear (S205). In other words, the second wear and the third wear are weighted with certain factors, and the first wear is computed as a weighted sum of the second wear and the third wear. According to yet another modified embodiment of the present invention, the larger of the second wear and the third wear may be adopted as the first wear. In this case also, in order to account for the contributions of the fore and aft travel and the lateral travel of the cart 1 to the wear of the main wheel 19, a first predetermined factor and a second predetermined factor may be multiplied to the second wear and the third wear, respectively, before determining which of these values is greater. In any case, the first wear is then transmitted to the display unit 44 as the wear of the main wheel 19 on the display unit 44.

Advantages of the wear computing system 200 of the second embodiment will be discussed in the following. The wear computing system 200 of the second embodiment takes into account the lateral travel of the cart 1 in the lateral direction, in addition to the fore and aft travel of the cart 1. Therefore, the wheel wear can be estimated with an increased accuracy.

When certain factors are multiplied to the fore and aft travel distance and the lateral travel distance in computing or estimating the wheel wear, an even higher accuracy may be obtained.

Figure 7:
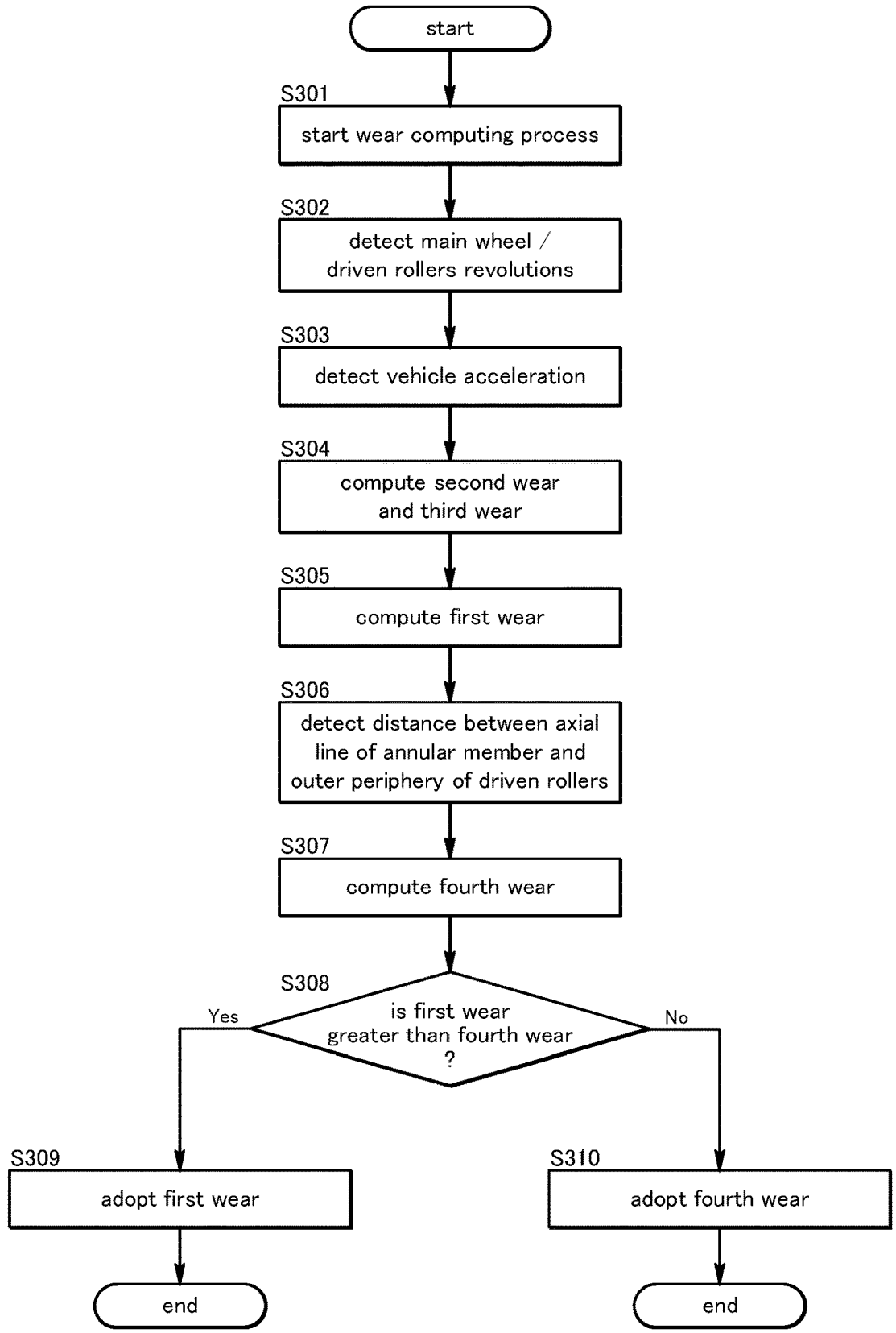
FIG. 7 is a flowchart of the wear computing process executed by the wear computing system of a third embodiment of the present invention.

The wear computing process performed by a wear computing system 300 according to a third embodiment of the present invention will be described in the following with reference to the flowchart shown in FIG. 7. In the wear computing process performed by the wear computing system 300 of the third embodiment, the wear (wheel wear) of the omnidirectional wheel 3 is computed by taking into account both the fore and aft travel and the lateral travel of the omnidirectional wheel 3. Therefore, the revolution measurement module 48 is configured to measure not only the revolutions of the main wheel 19 but also the revolutions of the driven rollers 32 around the rotational center lines thereof. Furthermore, the wear computing system 300 further includes a temperature measurement module 52 placed on the vehicle body 2 so as to oppose the driven rollers 32 for measuring the temperature of the driven rollers 32 in a contactless manner, a distance measurement module 50 placed on the vehicle body 2 so as to laterally oppose the main wheel 19 for measuring a distance from a point on the outer periphery of the main wheel 19 (or the drive rollers 32) directly under the axial line Y1 from the central axial line Y1, and a vertical load sensor 54 for detecting the vertical load applied to each of the omnidirectional wheels 3. The signals provided by these modules are forwarded to the control unit 7. The effective diameter of the main wheel 19 or the driven rollers 32 changes depending on the loading of the cart 1 on the main wheel 19. Further, the elastic modulus of the driven rollers 32 changes depending on the ambient temperature. As a result, the diameter of the main wheel 19 or the driven rollers 32 changes depending on the vertical load and the elastic modulus or the ambient temperature. It is preferable to take into account the vertical load and temperature on the diameter of the main wheel 19 or the driven rollers 32, and to eliminate the influences of changes in the diameter of the main wheel 19 or the driven rollers 32 due to the changes in the deformation of the main wheel 19 (driven rollers 32) from the computation of the wear of the main wheel 19 or the driven rollers 32.

The wear computing process performed by a wear computing system 300 of the third embodiment is similar to that performed by the wear computing system 200 of the second embodiment. More specifically, steps S201 to S205 are essentially identical to steps S301 to S305.

However, in the third embodiment, in step S306, the wear computing system 300 measures the distance between the central axial line Y1 and the point on the outer periphery of the main wheel 19 directly under the central axial line Y1 by using the distance measurement module 50 which may consist of a contact probe or a laser sensor.

Thereafter, the wear computing system 300 determines the difference between the current distance between the central axial line Y1 and the point on the outer periphery of the main wheel annular member 31 as measured by the distance measurement module 50 and the original distance at the start of the corresponding wear computing process. The wear given as the difference between the original distance and the current distance is adopted as "fourth wear" (step S307). The wear computing system 300 then compares the first wear and the fourth wear (S308). If the first wear is larger than the fourth wear, the first wear is adopted as the wear (wheel wear) of the omnidirectional wheel 3 (step S309). If the fourth wear is larger than the first wear, the fourth wear is adopted as the wear (wheel wear) of the omnidirectional wheel 3 (step S310). Therefore, since the wear (wheel wear) of the omnidirectional wheel 3 is obtained by comparing the values of wear calculated by using two different methods, the calculation accuracy of the wear amount is further improved.

The present invention has been described in terms of specific embodiments, but is not limited by such embodiments, and can be modified in various ways without departing from the scope of the present invention. For example, the display unit 44 may display any combination of the wheel wear, the first wear, the second wear, the third wear, and the fourth wear on the screen thereof. Also, the various features of different embodiments can be combined freely combined without departing from the scope of the present invention.

The invention claimed is:

1. A wear computing system for computing a wear of a wheel of a vehicle, comprising:
   a revolution sensor configured to detect a number of revolutions of the wheel;
   an acceleration sensor configured to detect an acceleration of the vehicle in a travel direction thereof; and
   a control unit configured to compute a travel distance of the vehicle from the acceleration of the vehicle, and compute the wear from the travel distance and the number of revolutions of the wheel, wherein the wheel includes a main wheel, the main wheel including an annular member having a laterally extending central axial line, and a plurality of driven rollers rotatably supported by the annular member around tangential lines of the annular member at respective positions of the driven rollers, and a pair of drive disks, each drive disk including a hub supported by a vehicle body of the vehicle on a corresponding side of the main wheel so as to be rotatable around a rotational center line substantially coaxial with the central axial line of the annular member, and a plurality of drive rollers circumferentially positioned thereon so as to be rotatable around a rotational center line in a skewed relationship to the rotational center line of the hub and in engagement with the driven rollers, and wherein
   the revolution sensor is configured to detect a revolution number of the main wheel, and a revolution number of the driven rollers, the acceleration sensor is configured to detect a fore and aft acceleration and a lateral acceleration of the vehicle, and the control unit is configured to compute a fore and aft travel distance from the fore and aft acceleration, a second wear from the fore and aft travel distance and the revolution number of the main wheel, a lateral travel distance from the lateral acceleration, a third wear from the lateral travel distance and the revolution number of the driven rollers, and a first wear from the second wear and the third wear, the first wear being the wear of the wheel.

2. The wear computing system according to claim 1, wherein the wear is computed as a reduction in an outer diameter of the wheel which is obtained from a difference between a travel distance as computed from the acceleration of the vehicle and a travel distance as computed from the number of revolutions of the wheel.

3. The wear computing system of claim 1, wherein the control unit computes the sum of the second wear and the third wear as the first wear.

4. The wear computing system of claim 1, wherein the wear computing system further comprises a measuring device for measuring a distance between the central axial line of the main wheel and a point on an outer periphery of the main wheel directly under the central axial line, and the control unit is configured to compute a fourth wear by comparing the measured distance and an original distance between the central axial line of the main wheel and the point on the outer periphery of the main wheel, the fourth wear being adopted as the wear of the wheel, instead of the first wear, when the fourth wear is larger than the first wear.

5. The wear computing system of claim 1, wherein the vehicle is provided with a drive unit for rotating the driven rollers according to a prescribed schedule while the vehicle travels in the fore and aft direction.

6. The wear computing system according to claim 5, wherein the vehicle is provided with a pair of wheels arranged on either side, and when the vehicle is traveling in the fore and aft direction, the drive unit is operated such that the driven rollers of the main wheel are rotated in opposite directions according to the prescribed schedule.

7. The wear computing system of claim 1, wherein the wear computing system further comprises a display unit that displays at least one of the wheel wear, the first wear, the second wear, and the third wear.

8. The wear computing system of claim 1, wherein the wear computing system further comprises a temperature sensor for detecting a temperature of the driven rollers, and a vertical load sensor for detecting a vertical load of the vehicle, the control unit being configured to compute an effective diameter of the driven rollers and/or the main wheel by taking into account an elastic modulus of the driven rollers under the detected temperature, and the detected vertical load, and to compute the travel distance from the revolution number of the driven rollers and/or the revolution number of the main wheel by taking into account of the effective diameter.

9. The wear computing system according to claim 1, wherein the vehicle is provided with a drive unit for driving the wheel, and the revolution sensor is configured to count revolutions of an output of the drive unit, and the number of revolutions of the wheel is obtained by multiplying a coefficient greater than zero and smaller than 1 to a count of the revolutions of the output of the drive unit.

\* \* \* \* \*